(12) United States Patent
Baker

(10) Patent No.: US 10,106,123 B2
(45) Date of Patent: Oct. 23, 2018

(54) FIRING MECHANISM

(71) Applicant: Moog Controls Limited, Tewkesbury, Gloucestershire (GB)

(72) Inventor: Michael Baker, Gretton (GB)

(73) Assignee: Moog Controls Limited, Tewkesbury, Gloucestershire (GB)

( * ) Notice: Subject to any disclaimer, the term of this patent is extended or adjusted under 35 U.S.C. 154(b) by 0 days.

(21) Appl. No.: 15/500,935

(22) PCT Filed: Aug. 4, 2015

(86) PCT No.: PCT/GB2015/052254
§ 371 (c)(1),
(2) Date: Feb. 1, 2017

(87) PCT Pub. No.: WO2016/020669
PCT Pub. Date: Feb. 11, 2016

(65) Prior Publication Data
US 2017/0232924 A1    Aug. 17, 2017

(30) Foreign Application Priority Data

Aug. 6, 2014 (GB) .................................. 1413898.6

(51) Int. Cl.
*B60R 21/18* (2006.01)
*B60R 21/274* (2011.01)
*B60R 21/01* (2006.01)

(52) U.S. Cl.
CPC ............ *B60R 21/274* (2013.01); *B60R 21/01* (2013.01); *B60R 2021/01286* (2013.01)

(58) Field of Classification Search
CPC .................. B60R 21/274; B60R 21/01; B60R 2021/01286
USPC .......................... 280/733, 741, 742, 803, 807
See application file for complete search history.

(56) References Cited

U.S. PATENT DOCUMENTS

| | | | |
|---|---|---|---|
| 4,037,358 A | 7/1977 | Rosenbaum | |
| 5,538,073 A * | 7/1996 | Stopa ..................... | F02C 7/105 165/6 |
| 8,857,854 B2 * | 10/2014 | Midorikawa .......... | B60R 22/46 280/806 |
| 2005/0284976 A1 * | 12/2005 | Holbein .............. | B60R 22/4628 242/374 |
| 2008/0012284 A1 * | 1/2008 | Inuzuka ................. | B60R 22/46 280/807 |
| 2008/0290204 A1 * | 11/2008 | Verhoven ............ | B60R 22/4633 242/374 |
| 2009/0048739 A1 * | 2/2009 | Midorikawa .......... | B60R 22/44 701/45 |

(Continued)

FOREIGN PATENT DOCUMENTS

CN        103818338 A     5/2014
DE   10 2011 086186 A1   5/2013
(Continued)

*Primary Examiner* — Toan C To
(74) *Attorney, Agent, or Firm* — Hodgson Russ LLP

(57) ABSTRACT

A firing mechanism (25) for activation of a pneumatic stored energy system having a motor (50) connected to a vessel (20) by a tether, the vessel (20) containing a pressurized fluid. Activation of the motor (50) causes the tether to wind, applying a linear force to an attachment region of the vessel, fracturing the vessel (20) to release the pressurized fluid thereby activating the pneumatic stored energy system.

17 Claims, 3 Drawing Sheets

(56) References Cited

U.S. PATENT DOCUMENTS

| | | | | |
|---|---|---|---|---|
| 2009/0051157 A1* | 2/2009 | Murakami | .......... | B60R 21/0132 |
| | | | | 280/807 |
| 2011/0285115 A1* | 11/2011 | Putala | .................. | B60R 21/213 |
| | | | | 280/730.2 |
| 2016/0221534 A1* | 8/2016 | Asako | .................... | B60R 22/46 |
| 2017/0225651 A1* | 8/2017 | Asako | .................... | B60R 22/46 |

FOREIGN PATENT DOCUMENTS

| | | | |
|---|---|---|---|
| FR | 2823289 | A1 | 10/2011 |
| GB | 2201228 | A | 8/1988 |
| JP | 2000-237576 | A | 9/2000 |
| JP | 2007-154968 | A | 6/2007 |

* cited by examiner

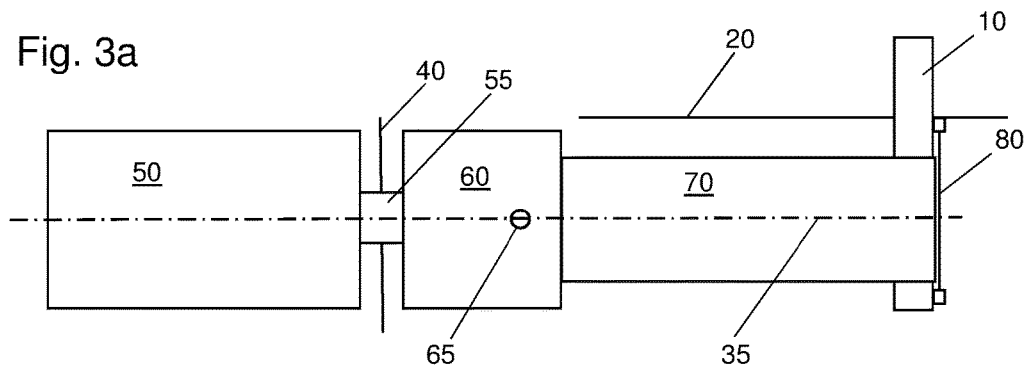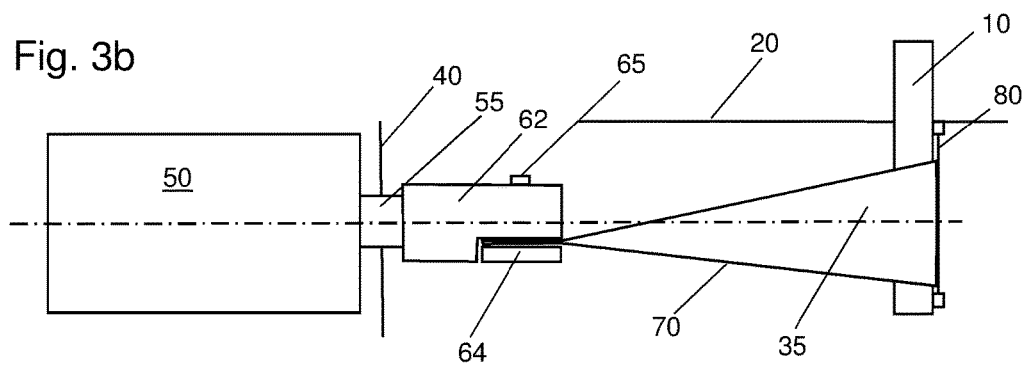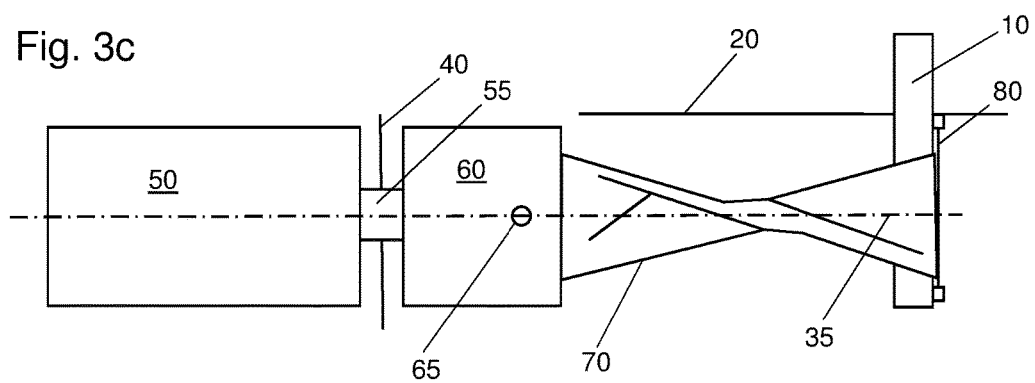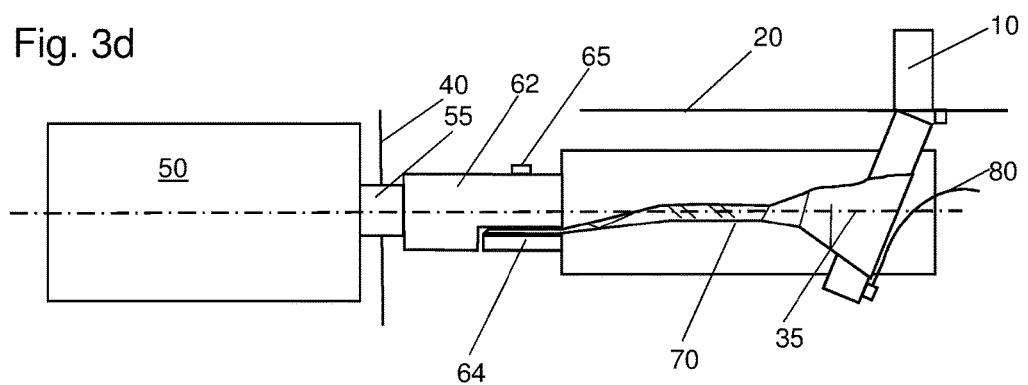

FIRING MECHANISM

CROSS-REFERENCE TO RELATED APPLICATIONS

The present application is the U.S. national phase of International Application No. PCT/GB2015/052254 filed Aug. 4, 2015 which claims priority of British Application No. 1413898.6 filed Aug. 6, 2014, the entirety of which is incorporated herein by reference.

FIELD OF THE INVENTION

The present invention is concerned with a firing mechanism for activation of a pneumatic stored energy system, and a method of activating a pneumatic stored energy system.

BACKGROUND OF THE INVENTION

Pneumatic stored energy systems have many applications. In transport safety they may be used to rapidly inflate various devices such as car air bags, aircraft passenger escape slides and helicopter flotation systems, in the case of an emergency incident. Due to their use in emergency incidents, rapid activation of the pneumatic stored energy system is necessary.

A pneumatic stored energy system may comprise, for example, a sealed vessel filled with a compressed helium-nitrogen (He/N) mixture, and some sort of firing mechanism to puncture a region of the vessel wall. A collection nozzle arranged about the vessel fluidly connects an inflatable device, folded in its uninflated state, to the vessel. In use, the firing mechanism causes a region of the vessel wall to puncture so as to supply the compressed He/N mixture via the nozzle to inflate the inflatable device.

Typically, pyrotechnic actuators have been used as a firing mechanism to trigger the pneumatic stored energy systems to inflate the specific device.

In use, an electric current is passed through a wire buried in a chemically reactive substance (the pyrotechnic), causing the pyrotechnic to burn. As the pyrotechnic burns, it produces a gas. The burn is contained within a sealed cavity of a container, and the pressure caused by the generation of exhaust gasses is applied to a piston fitted in the cavity at the end of the container. The piston moves due to the applied gas pressure and the linear movement can be used to shear through a diaphragm, or to bend and break a hollow pillar, thus releasing the stored pneumatic energy.

The use of pyrotechnic actuators is highly regulated. The potentially hazardous substances used in pyrotechnic actuators are difficult to handle and store. These potentially hazardous substances also require expensive and time consuming checks, for both the producer and end user. The potentially hazardous substances may also have a limited life-span, requiring replacement.

An alternate firing mechanism for activating a pneumatic stored energy system is through the use of shape memory alloys. The shape memory alloy may be caused to pull on a hollow break-off pillar and break it, thus releasing the stored pneumatic energy.

In this case the shape memory alloy is stretched during heat treatment such that it retains its stretched dimension during operation at normal, ambient, temperature. When the alloy is heated, for instance by passing an electrical current through it, it reverts to its unstretched dimensions. The change in length and resulting linear force can be used to break a hollow pillar.

However, shape memory alloy firing mechanisms often perform unreliably. Furthermore there remains the risk of unscheduled operation should the local environment conditions change.

SUMMARY OF THE INVENTION

It is an aim of the present invention to provide a firing mechanism for activation of a pneumatic stored energy system that is simple, reliable, re-useable, lightweight, of relatively small size, low cost, and which may be activated rapidly.

According to the first aspect of the invention there is provided a firing mechanism for activation of a pneumatic stored energy system, the firing mechanism comprising: a motor having a drive coupling; a vessel having an attachment region; and a tether; a first part of the tether being attached to the drive coupling of the motor and a second part of the tether being attached to the attachment region of the vessel, wherein activation of the motor to rotate the drive coupling causes the tether to wind, applying a linear force to the attachment region of the vessel, fracturing the vessel to activate the pneumatic stored energy system.

The firing mechanism imparts a known linear force to the vessel, as regulated by the rotation of the motor and the dimensions of the tether. The firing mechanism therefore may be used reliably and repeatably. The use of a positively controlled motor reduces the risk of accidental deployment, as the case may be, for example, with shape memory alloys activated by altering local environmental conditions. Furthermore, the use of pyrotechnics is not required.

Preferably the vessel includes a sensor, arranged to sense when the vessel is fractured, to provide a signal to deactivate the motor.

Advantageously this prevents the motor from continuing to operate unnecessarily once the pneumatic stored energy system has been activated.

Preferably the sensor is a fuse arranged so as to break when the vessel is fractured, to deactivate the motor.

The fuse provides a fail-safe cut out for the motor only once the firing mechanism has activated the pneumatic stored energy system.

Preferably the fuse is a wire arranged across the attachment region of the vessel. Alternatively the fuse is an electrical contact, arranged across the attachment region of the vessel.

Preferably the attachment region of the vessel is a region of weakness.

Advantageously this reduces the requisite linear force that must be applied to the attachment region of the vessel to ensure fracturing of the vessel. This reduction may beneficially be realised through the use of lighter components in the firing mechanism, a reduced motor speed (rotation per minute, (rpm)) or indeed a reduced number of rotations needed before fracture, resulting in a more rapid activation of the pneumatic stored energy system.

Preferably the attachment region of the vessel is a hollow break-off pillar.

The hollow break-off pillar advantageously provides both a region of weakness and predetermined fracture region of the vessel, such that the gasses expelled by the fracture of the vessel may be readily collected for, or directed to, their use.

Alternatively the attachment region of the vessel is a tear panel.

The tear panel advantageously provides both a region of weakness and predetermined fracture region of the vessel.

Preferably the tether is a continuous loop.

Advantageously the tether may therefore be attached to the first and or second region by hooking the loop around that region. This arrangement provides a simple attachment of the firing mechanism parts. It reduces the number of components required for the firing mechanism, reducing weight, cost and potential failure modes.

Preferably the first part of the tether is attached to the drive coupling by clamping the first part of the tether between a pair of abutting jaws of the drive coupling.

This arrangement advantageously provides a controlled wind as the motor causes the drive coupling to rotate. Furthermore, after use, a new tether may be fitted such that the firing mechanism may be used multiple times.

Preferably the motor is an electric motor. Preferably electric motor is a DC motor.

Advantageously an electric motor can impart an instant torque to initiate winding of the ribbon.

Preferably the tether is a ribbon.

Advantageously the ribbon, extending perpendicularly to the axis of rotation of the motor, to define an aspect ratio, imparts a greater force per wind, (or full rotation of the motor), proportional to its aspect ratio. Therefore a reduced number of rotations are needed before fracture.

Preferably the ribbon is made from a woven fabric. Preferably the woven fabric is an aramid fibre braid. Alternatively the woven fabric is cotton. Alternatively the woven fabric is an aramid fibre cloth. Alternatively the woven fabric is carbon fibre.

Such materials provide a lightweight connection to the vessel. A relatively low inertia is therefore required to initiate winding of the ribbon by the motor, meaning a comparatively smaller motor may be used than with heavier ribbon materials.

Preferably the firing mechanism is triggered by a remote switch.

According to a second aspect of the present invention there is provided a method of activating a pneumatic stored energy system, the method comprising the steps of: providing a motor having a drive coupling; a vessel having an attachment region; and a tether; a first part of the tether being attached to the drive coupling of the motor and a second part of the tether being attached to the attachment region of the vessel; activating the motor to rotate the drive coupling, causing the tether to wind, which applies a linear force to the vessel, fracturing the vessel to activate the pneumatic stored energy system.

Preferably the method includes the step of providing a sensor arranged to sense when the vessel is fractured, the sensor providing a signal to deactivate the motor when the vessel is fractured.

According to a further aspect of the present invention there is provided an actuator comprising:
 a motor having a drive coupling;
 a tether;
 a first part of the tether being attached to the drive coupling of the motor and a second part of the tether being remote from the drive coupling, wherein actuation of the motor to rotate the drive coupling causes the tether to wind, thereby drawing the second part towards the first part to effect actuation of the actuator.

Preferably the drive coupling is rotatable relative to a body of the motor and the second part is fixed non-rotatable relative to the body.

Preferably the tether winds about a longitudinal axis of the tether.

BRIEF DESCRIPTION OF THE DRAWING VIEWS

An example of the firing mechanism for activation of a pneumatic stored energy system in accordance with the present invention will now be described with reference to the appended drawings in which:

FIG. 1b is a partial enlarged cross-sectional view of a hollow break-off pillar of FIG. 1a;

FIGS. 3a to 3d are schematic plan views of the firing mechanism of FIG. 2 isolation, various stages of operation.

DETAILED DESCRIPTION OF THE INVENTION

Figure 1A:
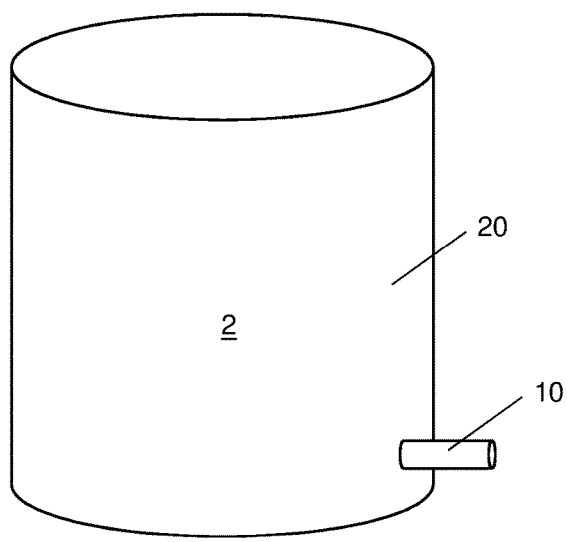
FIG. 1a is a perspective view of a vessel with a hollow break-off pillar.
Figure 1B:
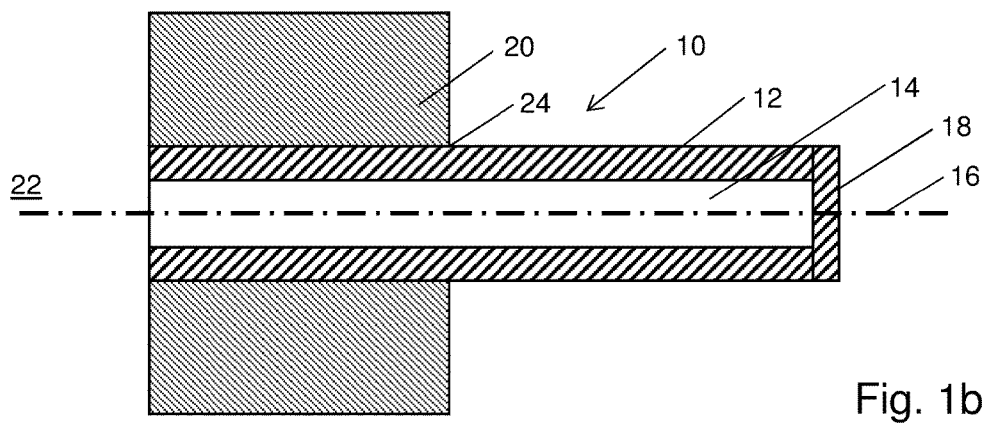
Figure 1C:
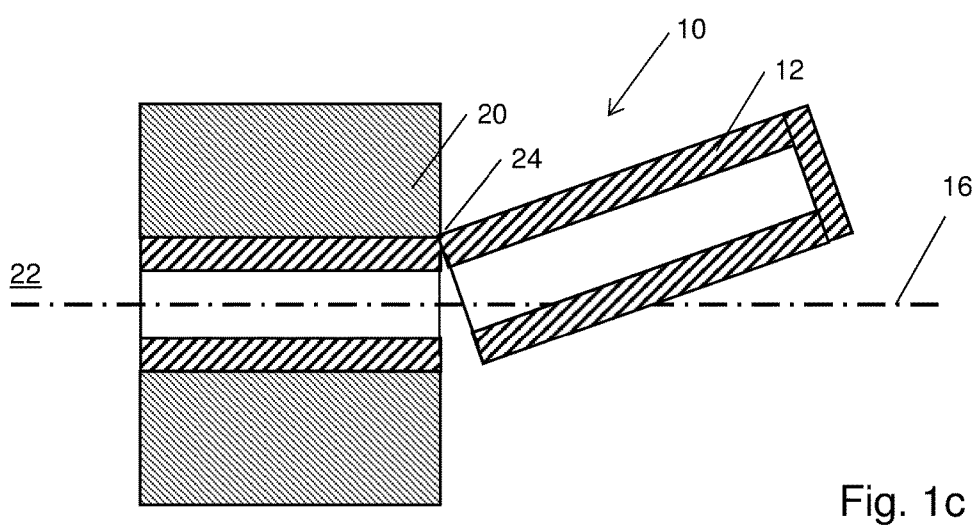
FIG. 1c is a partial enlarged cross-sectional view of a hollow break-off pillar of FIG. 1a in a fractured state.

In FIGS. 1a to 1c, a sealed cylindrical vessel 2, filled with a high pressure gas, has a hollow break-off pillar 10 arranged protruding perpendicularly from the vessel wall 20. The hollow break-off pillar 10 comprises a cylindrical tube 12 having break-off pillar axis 16, fitted within a circular opening 24 of a vessel wall 20. The cylindrical tube 12 defines a lumen 14 which is capped at one end by cap 18. The lumen 14 is in fluid communication with the interior space 22 defined within the vessel wall 20.

The cylindrical tube 12 is designed to fracture under a force applied perpendicular to its axis 16. Fracture will commonly occur at the junction between the vessel wall opening 24 and the cylindrical tube 12 as shown in FIG. 1b. Fracture of the cylindrical tube 12 therefore allows escape of the high pressure gases held within interior space 22.

Figure 2:
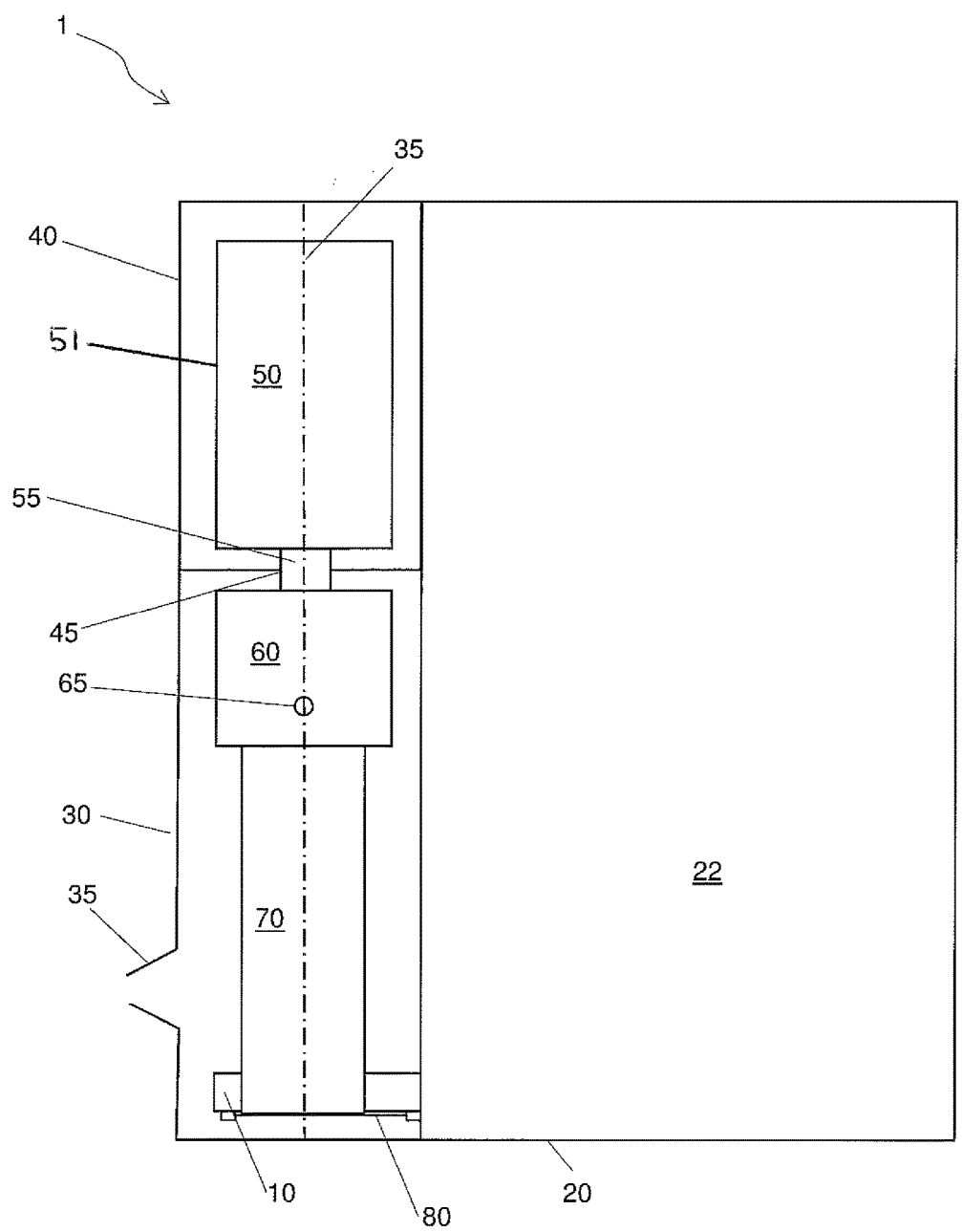
FIG. 2 is a schematic plan view of the firing mechanism installed with the pneumatic stored energy system.

Referring to FIG. 2, a pneumatic stored energy system 1 comprises a sealed vessel 20 defining interior space 22 having a compressed helium-nitrogen mixture therein.

A firing mechanism 25 is arranged alongside the vessel 2. The firing mechanism 25 comprises a motor 50, a tether and a hollow break-off pillar 10. In this embodiment the tether is a ribbon 70.

The motor 50 is arranged within a motor chassis 40. A body 51 of the motor is fixed to the motor chassis 40. The motor has a drive shaft 55, which passes through a circular aperture 45 in a wall of the motor chassis 40. The drive shaft 55 terminates in a drive coupling 60.

The drive coupling 60 has an L-shaped main body part 62 and a jaw part 64 (as shown in FIG. 3b). The jaw part 64 is sized to fit in a recess defined by the L-shaped main body part 62. The jaw part 64 is connectable to the main body part 62 by fastening arrangement 65.

The ribbon 70 is a substantially inextensible loop of woven aramid fibre braid. The ribbon is flexible so that it may be wound. It has an overall length of 210 mm. It has a width of 30 mm. It has an aspect ratio, calculated as the length divided by the width, of 7.

The ribbon 70 is clamped between the jaw part 64 and the main body part 64 of the drive coupling 60. The fastening arrangement 65 comprises a bolt that passes through the main body part 64, the ribbon 70 and the jaw part 64 and is secured by a nut. The other end of the ribbon 70 is looped around the hollow break-off pillar 10. The ribbon 70 therefore extends between the drive coupling 60 and the hollow break-off pillar 10, bridging a gap of less than 155 mm. The flexible nature of the ribbon 70 allows it to be looped around the hollow break-off pillar 10 without imparting a force sufficient to break the hollow break-off pillar 10.

A collection nozzle 35 is arranged adjacent the hollow break-off pillar. An inflatable helicopter flotation system is fluidly attached to nozzle 35 (not shown).

A fuse wire 80 is arranged along the cylindrical tube 12 of the hollow break-off pillar 10, in the region of anticipated fracture. The fuse wire 80 is electrically connected to the motor 50.

Referring to FIGS. 3a to 3d, the firing mechanism 25 is shown viewed in direction III in FIG. 2. FIGS. 3a to 3d show the firing mechanism 25 in four stages of the firing process, as will be explained below.

With the firing mechanism 25 set up so that the ribbon 70 is clamped at one end between the jaw part 64 and the main body part 64 of the drive coupling 60, and looped around the hollow break-off pillar 10 at the other end, the device is ready to fire, (FIG. 3a).

In the instance of a crash or impact scenario requiring deployment of the pneumatic stored energy system, a remote switch is activated by an impact detection alarm signal. Such an impact detection alarm signal could be raised manually, for example by a pilot, or automatically, as is known in the art. For example, the impact detection alarm signal could be initiated by a positive reading on a water sensor, an impact sensor or a sensor monitoring the instant flight characteristics of the vehicle to which the pneumatic stored energy system is fitted, or a combination of more than one of the above.

The remote switch causes current to be passed through motor 50. The motor starts to rotate drive shaft 55 causing a quarter turn pivot of the drive coupling 60, and ribbon 70 begins to wind (FIG. 3b).

As the drive shaft 55 and drive coupling 60 complete one full revolution, the winding of ribbon 70 and associated shortening thereof causes linear force F parallel with the drive shaft axis 35 and perpendicular to the break-off pillar axis 16, to pull the break-off pillar 10 towards the drive coupling 60, (FIG. 3c).

Following three and one quarter full revolutions of the drive shaft 55 and drive coupling 60, (FIG. 3d), the ribbon 70 has been wound such that the linear force on the hollow break-off pillar 10 is sufficient to fracture the hollow break-off pillar 10 as already described with reference to FIGS. 1b and 1c. The fuse wire 80 is also broken, which arrests the supply of current to the motor 50.

The firing mechanism 25 has therefore activated the pneumatic stored energy system 1, as compressed helium-nitrogen mixture contained within the vessel 20 is able to escape via the now fractured hollow break-off pillar 10, and be collected to inflate the inflatable helicopter flotation system via nozzle 35.

It is to be understood that the number of rotations required to fracture the hollow break-off pillar is exemplary in nature only, and could be more or less depending of the strength of the hollow break-off pillar and the dimensions of the tether.

The tether could, for example, comprise one or more single stands strands of fibre arranged between the drive coupling 60 and the hollow break-off pillar 10.

In alternative embodiments, the tether could be secured to the drive coupling by gluing or through the use of further fasteners, or both.

In alternate embodiments, the tether could be made of cotton or from an aramid fibre cloth or from carbon fibre.

In the disclosed embodiment, the hollow break-off pillar extends perpendicularly from a wall of the vessel and both the motor drive axis and the ribbon extend perpendicularly to the hollow break-off pillar. Other configurations are also envisaged, limited only to the extent that a force sufficient to fracture the hollow break-off pillar is applied by winding of the tether. Alternate or additional means for ensuring that fracture occurs at a specific location under a pre-determined force includes providing a notch in the cylindrical tube 20, of the hollow break-off pillar 10.

In the disclosed embodiment, an inflatable helicopter flotation system is fluidly attached to nozzle 35. As described above, alternate inflatable devices may be fluidly attached to nozzle 35, such as an emergency escape slide for an aircraft, or a vehicle airbag.

In the disclosed embodiment, a compressed helium-nitrogen mixture is given as an exemplary gas contained within vessel 20. Other gases are envisaged for use with the device of the present invention.

The firing mechanism described can be considered to be an actuator. As will be appreciated the first part of the tether is attached to the drive coupling of the motor and the second part of the tether is remote from the drive coupling. Activation of motor to rotate the drive coupling causes the tether to wind, thereby drawing the second part of the tether towards the first part of the tether to effect actuation of the actuator. Accordingly, an actuator according to the present invention is not limited to being used to apply a linear force to an attachment region of a pressure vessel thereby fracturing the pressure vessel to actuate the pneumatic stored energy system. Actuators according to the present invention can be used to apply a force to any other type of component. The tether of actuators according to the present invention may be a continuous loop and/or a ribbon. The ribbon may be made from a woven fabric. The motor of an actuator according to the present invention may be an electric motor. The drive coupling of the motor may be rotatable relative to a body of the motor.

What is claimed is:

1. A firing mechanism for activation of a pneumatic stored energy system, the firing mechanism comprising:
    a motor having a drive coupling;
    a vessel having an attachment region; and
    a tether;
    a first part of the tether being attached to the drive coupling of the motor and a second part of the tether being attached to the attachment region of the vessel, wherein activation of the motor to rotate the drive coupling causes the tether to wind, applying a linear force to the attachment region of the vessel, fracturing the vessel to activate the pneumatic stored energy system.

2. A firing mechanism according to claim 1, wherein the vessel includes a sensor arranged to sense when the vessel is fractured, to provide a signal to deactivate the motor.

3. A firing mechanism according to claim 2, wherein the sensor is a fuse arranged so as to break when the vessel is fractured, to deactivate the motor.

4. A firing mechanism according to claim 3, wherein the fuse is a wire arranged across the attachment region of the vessel.

5. A firing mechanism according claim 3, wherein the fuse is an electrical contact arranged across the attachment region of the vessel.

6. A firing mechanism according to claim 1, wherein the attachment region of the vessel is a region of weakness.

7. A firing mechanism according to claim 1, wherein the attachment region of the vessel is a hollow break-off pillar.

8. A firing mechanism according to claim 1, wherein the attachment region of the vessel is a tear panel.

9. A firing mechanism according to claim 1, wherein the tether is a continuous loop.

10. A firing mechanism according to claim 1, wherein the first part of the tether is attached to the drive coupling by clamping the first part of the tether between a pair of opposed jaws of the drive coupling.

11. A firing mechanism according to claim 1, wherein the attachment region of the vessel is disposed within a loop of the second part of the tether.

12. A firing mechanism according to claim 1, wherein the motor is an electric motor.

13. A firing mechanism according to claim 1, wherein the tether is a ribbon.

14. A firing mechanism according to claim 13, wherein the ribbon is made from a woven fabric.

15. A firing mechanism according to claim 1, wherein the firing mechanism is triggered by a remote switch.

16. A method of activating a pneumatic stored energy system, the method comprising the steps of: providing a motor having a drive coupling; a vessel having an attachment region; and a tether; a first part of the tether being attached to the drive coupling of the motor and a second part of the tether being attached to the attachment region of the vessel; activating the motor to rotate the drive coupling, causing the tether to wind, which applies a linear force to the vessel, fracturing the vessel to activate the pneumatic stored energy system.

17. A method of activating a pneumatic stored energy system according to claim 16, comprising the further step of providing a sensor arranged to sense when the vessel is fractured, the sensor providing a signal to deactivate the motor when the vessel is fractured.

* * * * *